United States Patent [19]
Berkebile et al.

[11] 3,931,503
[45] Jan. 6, 1976

[54] SYSTEM FOR OPERATING A BOILING WATER REACTOR STEAM TURBINE POWER PLANT UTILIZING DUAL ANALOG THROTTLE PRESSURE CONTROLLERS

[75] Inventors: Gary W. Berkebile; Francesco Lardi, both of Pittsburgh, Pa.; Leaman B. Podolsky, Wilmington, Del.

[73] Assignee: Westinghouse Electric Corporation, Pittsburgh, Pa.

[22] Filed: Nov. 13, 1973

[21] Appl. No.: 415,868

[52] U.S. Cl. .......... 235/151.21; 176/19 EC; 415/17
[51] Int. Cl. ..................... G06f 15/56; G21c 7/36
[58] Field of Search .......... 235/151.21, 151; 444/1; 176/19 EC, 20, 21, 24, 25, 55, 39, 87; 60/39.24, 39.26, 39.3, 108 R, 108 S; 415/1, 16, 17; 318/563, 564, 565, 590, 591

[56] References Cited
UNITED STATES PATENTS

| | | | |
|---|---|---|---|
| 3,552,872 | 1/1971 | Giras et al. | 415/17 |
| 3,572,958 | 3/1971 | Jensen | 415/17 |
| 3,588,265 | 6/1971 | Berry | 235/151.21 UX |
| 3,630,839 | 12/1971 | Podolsky | 176/24 |
| 3,709,626 | 1/1973 | Eggenberger | 415/17 |

Primary Examiner—Joseph F. Ruggiero
Attorney, Agent, or Firm—H. W. Patterson

[57] ABSTRACT

A combined digital computer/analog control system for operating a boiling water reactor-steam turbine-power plant wherein one of two analog throttle pressure controllers is used for controlling the inlet and bypass valves. One of the pressure controllers is biased to provide a higher signal than the other; and such nonbiased controller is the one selected to control the valves. Each controller includes a pressure transducer, a summing device and amplifier, and a lead/lag circuit together with the appropriate power supply.

A failure detection system is used to switch the controllers from automatic to manual when a predetermined combination of controller components becomes defective. Also, such system is so organized that a transducer failure for one controller causes the other controller to assume control regardless of whether such failure results in a higher or lower than proper signal.

9 Claims, 7 Drawing Figures

3,931,503

SYSTEM FOR OPERATING A BOILING WATER REACTOR STEAM TURBINE POWER PLANT UTILIZING DUAL ANALOG THROTTLE PRESSURE CONTROLLERS

CROSS REFERENCE TO RELATED APPLICATION

Ser. No. 415,869 entitled "Improved Method And System For Operating A Boiling Water Reactor-Steam Turbine Plant With A Combined Digital Computer And Analog Control" filed by F. Lardi and L. B. Podolsky concurrently herewith and assigned to the present assignee, and incorporated by reference herein.

BACKGROUND OF THE INVENTION

The present invention relates to steam turbine plants and more particularly to electric power plants operated by steam turbines for which the steam supply is provided by a nuclear boiling water reactor.

In a boiling water nuclear reactor, the nuclear fuel is structured with a suitable geometry to provide for a sustained chain nuclear reaction as the coolant water passes through the fuel arrangement. Conventionally, the nuclear fuel is housed in elongated metallic tubes which are in turn assembled and supported in parallel arrays or bundles. The reactor core is formed from an assembly of the fuel bundles and it is housed in a large pressure vessel with provision for coolant flow along all of the fuel elements. Neutron absorbing control rods are supported within the core for movement relative to the fuel elements.

The design of the core and other reactor parameters determine the reactor power rating. Mechanical, nuclear, hydraulic and other details of the reactor design are the result of development programs aimed at achieving efficient performance for the plant owner.

Since water density is a large determinant of the rate of generation of slow neutrons which are required for the controlled propagation of the chain nuclear reaction, the power operating level of the reactor is partly determined by the accumulation of steam voids in the core volume. Increased coolant flow causes faster fuel rod cooling with reduced boiling and, accordingly, reduced void accumulation and higher reactor power. Decreased coolant flow has the opposite effects. Typically, coolant flow control can be used to control the boiling water reactor power level within a range of about 20% or 25% with a preset control rod placement.

The reactor generated steam is normally directed through separators and dryers within the pressure vessel, and the dry saturated steam is directly channeled at a pressure such as 1000 psi and a temperature such as 545°F to the utilization equipment, i.e., the turbine generator unit(s) of the electric power plant. Separated water is combined in the pressure vessel with external and internal recirculation flows and with return and makeup feedwater flow.

Since the boiling water reactor plant is the direct cycle type and since outlet steam pressure and reactor vessel pressure affect the void accumulation in the reactor core, it is desirable to operate the turbine inlet valves to determine the turbine and generator load level subject to pressure regulating demands of the reactor. With reactor pressure maintenance within a relatively narrow pressure band such as about 30 psi, reactor power level is controlled by coolant flow control within a limited range or by control rod movement if a different power range is required to meet load demand on the turbine generator unit(s).

In general, the steam turbine energization level is determined by the flow of the turbine inlet steam which in turn is determined by the steam conditions at the outlet of the steam source and by steam inlet valve positioning. The turbine drive power supplied for the plant generator(s) is desirably controlled to satisfy electrical load demand and frequency participation demand placed on the electric power plant by the plant operator or by an economic dispatch computer or by other means.

At substantially constant temperature throttle steam, turbine power is proportional to turbine steam flow, and if the throttle pressure is also substantially constant, the steam flow is proportional to impulse chamber steam pressure or the ratio of the impulse chamber steam pressure to the throttle steam pressure. As already indicated, positioning of the inlet steam valving must provide for reactor vessel pressure regulation as well as turbine energization level control. When the boiling water reactor power level corresponds to the plant load demand, the turbine inlet valves are positioned to produce both the desired reactor vessel pressure and the turbine steam flow required for satisfying plant electrical load demand.

A steam bypass system is also usually provided to direct steam flow from the reactor outlet to the plant condenser under certain conditions. Steam bypass in effect provides an interface between the boiling water reactor and the steam turbine during reactor startup and shutdown and during other periods such as during load rejection. In these cases, steam supplied by the reactor but not needed by the turbine is channeled to the condenser under control imposed on the bypass system by the throttle pressure control system.

Presently, boiling water reactor-steam turbine systems include a pair of redundant analog pressure controllers. These pressure controllers are typically conventional operational amplifiers having input circuitry that performs a summing function with respect to applied input signals; and are provided with a proportional characterization in accordance with a lead/lag function, for example. A bias is manually applied to one of the two parallel connected controllers so that the output signal of one is higher than the output signal of the other by the amount of the applied bias. The output signals of the controller are connected to a high signal selector, which passes only the higher of the two signals to control the steam throttle pressure. Thus, only one of the controllers is effectively controlling the system at any one time. Shifting the bias, of course, renders the output signal of the other controller effective to control the valves. Should one of the controllers become defective, the other controller can be manually placed in control of the system. However, if such malfunction results in the output signal being higher than normal, the defective controller would still be governing the system.

It is desirable, for such a pressure controller organization, to be so structured that regardless of the type of failure, the operation of either one of the controllers is transferred automatically to the other nondefective controller. Also, in the event of a malfunction of any of the components in both of the controllers, it is desirable that the valves be automatically tranferred to manual operation. With the benefit of such a system, reliable control of the boiling water reactor turbine control system can be effected; and the throttle pressure control can be automatically transferred to manual control of the bypass and governor valves immediately upon the failure of the automatic pressure control portion of the system. Not only is the immediate detection of pressure controller failures necessary for safety in the system, but it is also desirable that any disturbances to the system resulting from the opening or closing of valves due to such malfunctions be avoided.

SUMMARY OF THE INVENTION

Broadly, the present invention relates to a system and method of operating a boiling water reactor steam turbine plant utilizing redundant parallel pressure controllers that are so connected that one of the controllers is in a standby condition during operation of the plant. Such a system and method provides for the transferring of the defective controller to a standby condition when the other controller is operating properly; and for transferring the operation of the valves to manual control upon the detection of a malfunction in both of the controllers.

More specifically, the present invention relates to a boiling water reactor-steam turbine system wherein parallel connected redundant throttle pressure controllers provide an output to a signal selector. Each controller is provided with a pressure transducer with which a throttle pressure setpoint signal is compared for governing the controller output. A bias is selectively applied to one or the other of the controllers to determine which controller output is to be passed through the signal selector. The controller organization and transducers include a failure detection system that detects a failure in each transducer and each component of both controllers. A failure detected in any of the components of one controller or one transducer, if effectively controlling the system, results in control being assumed by the other throttle pressure controller. A failure detected in any component or pressure transducer of both of the controllers automatically transfers control of the valves to manual operation.

DESCRIPTION OF THE PREFERRED EMBODIMENT

Figure 1:
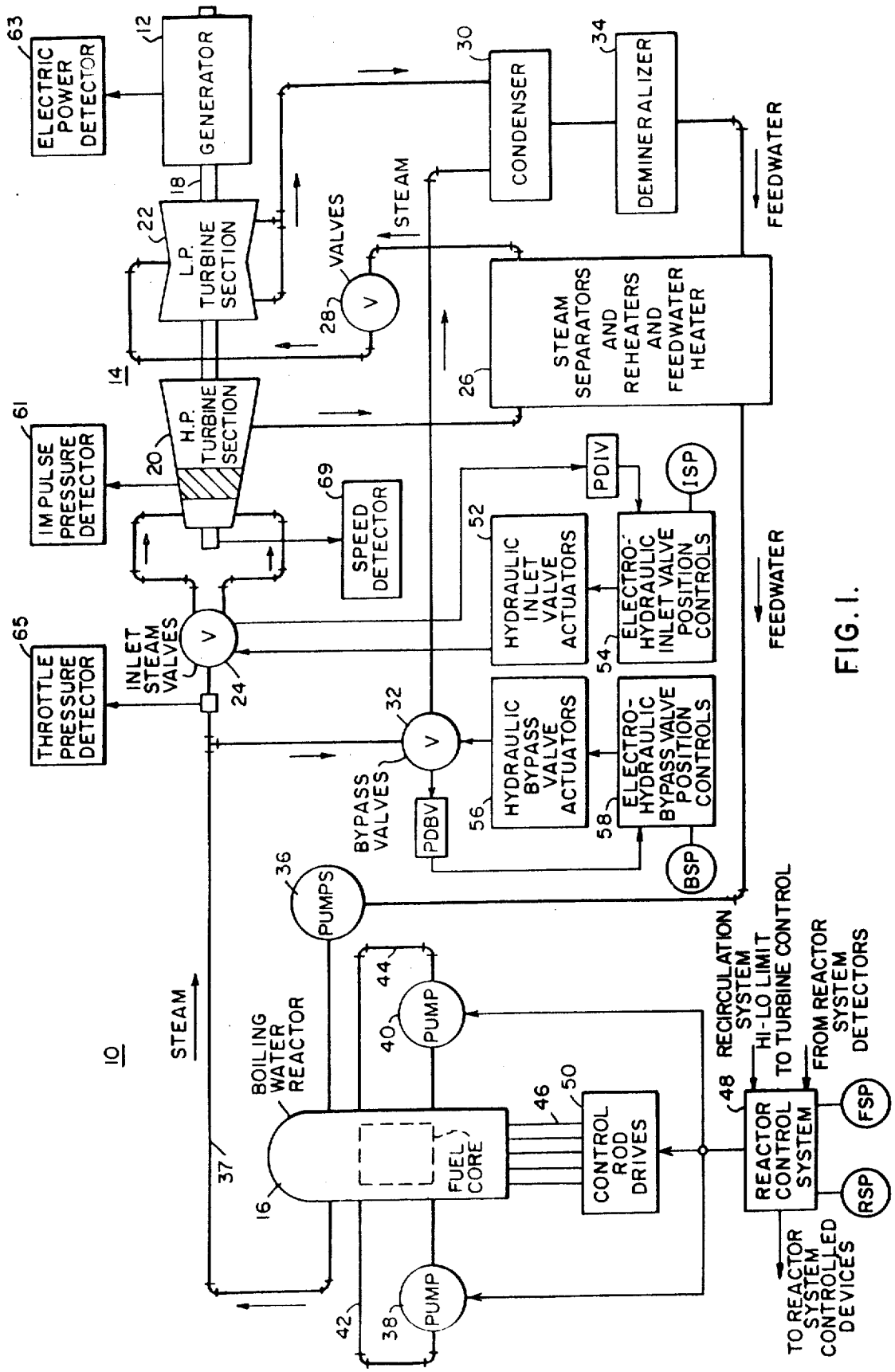
FIG. 1 is a schematic diagram of an electric power plant operated by boiling water reactor and steam turbine apparatus.

More specifically, there is shown in FIG. 1 an electric power plant 10 which is provided with a conventional electric generator 12 operated by a nuclear steam turbine 14 in accordance with the principles of the invention. A steam generating system for the turbine 14 includes a conventional nuclear boiling water reactor 16.

The nuclear steam turbine 14 is provided with a single output shaft 18 which drives the generator 12 to produce speed under steady-state conditions. Under transient electric load change conditions, system frequency may be affected and conforming turbogenerator speed changes would result. At synchronism, power contribution of the generator 12 to the network is normally determined by the turbine steam flow and the throttle pressure at which that flow is supplied by the boiling water reactor 16.

In this instance, the nuclear steam turbine 14 is of the multistage axial flow type and includes a high pressure section 20 and a double flow low pressure section 22. Each of the turbine sections 20 and 22 may include a plurality of expansion stages provided by stationary vanes and an interacting bladed rotor connected to the shaft 18. In other applications, nuclear steam turbines operated in accordance with the present invention can have other forms with more or fewer sections tandemly connected to one shaft or compoundly coupled to more than one shaft. For example, as many as three or more low pressure sections might be employed, and each section could have single flow or double or other plural flow paths.

Steam is directed to the nuclear turbine 14 through conventional inlet steam valves 24. In some installations, the valves 24 may include two or more throttle valves (not specifically indicated) which admit steam to the turbine steam chest (not indicated) and typically a plurality of up to four or more governor control valves (not specifically indicated) which are arranged to supply steam to turbine inlets arcuately spaced about the turbine high pressure casing.

The conventional nuclear turbine startup method is employed. Thus, the turbine speed is raised from the turning gear speed of about 2 RPM to synchronous speed under throttle valve control, if provided, or governor valve control. Then, the power system breaker(s) is closed and the governor valves are operated to meet the load demand. On shutdown, similar but reverse practices can be employed or conventional coast-down procedure can be used. In the load control mode, plant electrical load demand is met when the steam flow and throttle pressure conditions cause the turbine energization level to correspond to the plant electrical demand.

The total turbine energization is produced by steam flow through the high pressure section 20 and by steam flow through the low pressure section 22. Steam flow between the two turbine sections is directed through steam separators and reheaters as indicated by block 26 in order to raise the steam enthalpy level to a more efficient value. Stop valve(s) are included in the intersection steam flow path to stop steam flow when necessary for turbine overspeed protection.

Vitiated steam from the low pressure turbine section 22 is directed to a condenser 30. Reactor feedwater flow from the condenser 30 includes any makeup water flow and the flow resulting from condensation of the vitiated turbine steam as well as that resulting from condensation of the steam which is controllably diverted from the turbine 14 through bypass valves 32 directly to the condenser 30.

The feedwater flow is directed from the condenser 30 to a demineralizer 34 where corrosion products and other impurities are removed from the fluid. From the demineralizer 34, the feedwater is driven by one or more feedwater pumps 36 through a feedwater heater system indicated in the block 26 and into the pressure vessel of the nuclear boiling water reactor 16.

In the reactor 16, heat produced in the fuel rods contained within the fuel core is transferred to the coolant which flows along the rods. Steam is collected at the top of the pressure vessel and directed through one or more conduits to the turbine inlet valves 24 as indicated by the reference character 37. Since the steam produced by the reactor 16 is used directly for turbine energization, the plant operation is characterized as being of the single or direct cycle type.

Generally, it is necessary to hold the reactor vessel pressure within a relatively narrow range because the vessel pressure affects the reactivity rate and the reactor power operating level, i.e., the power level varies directly with the reactor pressure. Accordingly, it is necessary that the turbine throttle pressure be held within a relatively narrow range or, if desired and if possible, at the rated value by the imposition of throttle pressure control on the turbine inlet valve operation. Since turbine load is proportional to turbine steam flow or the ratio of impulse chamber pressure to throttle pressure (with the throttle steam at substantially constant pressure and temperature), turbine inlet valve control cannot satisfy load demand changes in the steady state unless changes are made in the steam generation rate at the steam source.

To enable turbine steam flow changes to be made to satisfy turbine and plant loading demand within the throttle pressure operating range, the reactor power operating level is changed as by changing the reactor core recirculation flow through controlled operation of centrifugal pumps 38 and 40 in recirculation flow loops 42 and 44. Jet pumps (not shown) can be used within the reactor vessel to produce a drive flow which forces coolant recirculation through and about the fuel core.

When it is desired to increase reactor power, steam void accumulation is reduced by increasing recirculation flow. Reduced reactor power requires reduced recirculation flow. Typically, recirculation flow control can be used to vary reactor power over a range as high as 25% or more.

Larger power changes require position changes in conventional control rods 46 to vary the amount of neutron absorption. Manual or possibly automatic control rod placement would normally also be subject to implementation of a core burnup management program.

A conventional reactor control system designated by block 48 is provided for determining the operation of the recirculation flow system and the operation of the control rods 46. Feedback signals or data are applied to the reactor control system 48 from predetermined reactor system detectors and manually or automatically operated analog controllers or other suitable control means in the reactor control system 48 generate outputs which correctively operate the recirculation flow pumps 38 and 40, drives 50 for the control rods 46 and other reactor system controlled devices.

In the recirculation flow control system, conventional coolant flow detectors (not shown) can be used to determine the flows in the loops 42 and 44 for feedback comparison to a computer determined recirculation flow setpoint FSP. Similarly, suitable position detectors generate control rod position feedback signals for comparison with control position setpoints RSP which are determined in accordance with the externally determined core management program and, if desired, in accordance with any demand for reactor power change in excess of the recirculation flow control range. In this case, automatically operated pump controllers vary the speed of the recirculation pump drives for flow correction and manually operated rod drive controllers are used to operate the rod drives to satisfy the rod position setpoints RSP. When the recirculation system is either at its maximum flow limit or at its minimum flow limit, which can be determined by pump speed for example, conventional contacts can be closed or opened or other suitable indicating signals provided for the turbine control system, as hereinafter described.

Positioning of the respective turbine throttle and governor inlet valves is effected by operation of respective conventional hydraulic actuators 52 under the control of respective electrohydraulic position control 54. Respective inlet valve position demand setpoint signals ISP are applied to the respective controls 54 under programmed computer control. Respective inlet valve position feedback signals PDIV are generated by respective linear differential transformer or other position detectors. Position error for any of the inlet valves 24 results in operation of the associated valve actuator 52 until the error is removed and the valve position demand ISP is satisfied.

Similarly, hydraulic bypass valve actuators 56 and electrohydraulic bypass valve position control 58 operate the bypass valves 32 to satisfy respective bypass valve position demand setpoint signals BSP which are determined by programmed computer operation. The bypass valves 32 provide for diverting steam not needed by the turbine 14 such as during startup and shutdown and during load control when load rejection conditions are imposed on the power plant 10. Bypass valve position feedback signals PDBV are generated by conventional position detectors for comparison to the individual setpoint signals BSP.

Each of the electrohydraulic position controls 54 or 58 includes a conventional analog controller (not indicated) which drives a suitable known actuator servo valve (not indicated) in the well known manner. In turn, the respective servo valves determine the operation of the valve actuators 52 and 56.

The reheat valves 28 are also controlled by a suitable hydraulically operated actuator (not indicated). A high pressure fluid supply system (not indicated in FIG. 1) provides the controlling fluid for operation of all of the hydraulic valve actuators. A lubricating oil system (not indicated in FIG. 1) is separately provided for turbine and other lubricating requirements. Both the high pressure fluid supply and the lubricating oil system can be placed under computer sequencing, monitoring and supervisory control.

Figure 2:
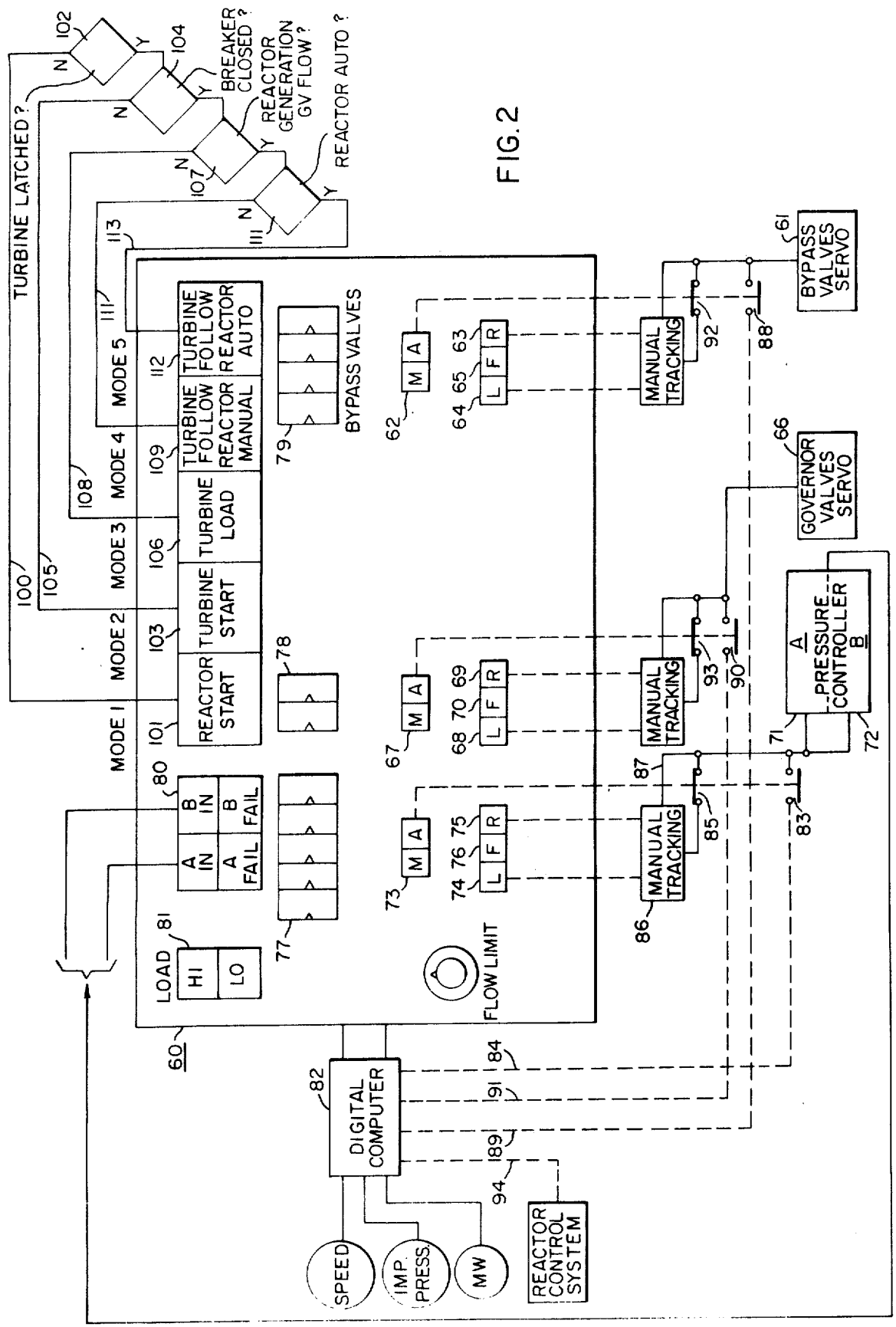
FIG. 2 is a schematic diagram of the control panel of the system and illustrates functionally various operational states of the system.

As illustrated in FIG. 2, a control and indication panel 60 is utilized for operating the boiling water reactor 16 and the steam turbine 14 in both the manual and automatic mode. Associated with each of the bypass valves 32 and its associated actuators 56 and 58 is a bypass valve servo control 61. Manual automatic pushbuttons 62 are operated to control the bypass valves through its servo 61 in either the manual or the automatic mode. When in the manual mode, pushbuttons 63 are operated to raise or open the bypass valves; and pushbutton 64 may be operated to lower or close the bypass valves. Pushbutton 65 when operated either lowers or raises the bypass valves more rapidly than normal. Associated with each of the steam inlet valves 24, which in this described embodiment are governor valves, is a servo controller 66. Pushbutton 67 is provided to manually operate the governor valves through its servo controller 66; and pushbuttons 68, 69 and 70, respectively, are provided to either lower, raise or move the valve at a more rapid rate. Pressure controllers 71 and 72 may also be operated either manually or automatically by operation of the mechanism 73. Similarly, when in manual operation, the pressure in the pressure controllers 71 and 72 may either be lowered, raised or operated at a more rapid rate by the operation of pushbuttons 74, 75 and 76, respectively. Position indicators 77, 78 and 79 are provided for indicating the various operative states of the pressure controllers 71 and 72, the governor valves or steam inlet valves 24 and the bypass valves 32, respectively. Indicator 80 is provided to inform the operator which pressure controller, 71 or 72, is controlling the system and whether or not such pressure controller has failed to function. Indicator 81 is provided to inform the operator whether or not the load is at its high or low limit.

A digital computer structure referred to at block 82 is interfaced with the control and indication panel to provide information and control as more fully described hereinafter. The general organization of such digital computer may be of the type described in copending U.S. patent application Ser. No. 247,877 entitled "System And Method For Starting, Synchronizing, And Operating A Steam Turbine With Digital Computer Control" filed by T. Giras et al on Apr. 26, 1972, assigned to the present assignee, and is incorporated herein by reference, as though set forth at length herein. Only those portions of the digital computer control organization that are specific to the present invention are described in detail.

When in manual control, contact 83 closes to connect an output generally referred to by a dashed line 84 from the digital computer 82 to the pressure controllers 71 and 72. Simultaneously, a contact 85 opens to disconnect the manual operation of the system through the panelboard 60, and the condition of the pressure controllers 71 and 72 is tracked by apparatus 86 over line 87 in order that transfer between manual and automatic can be effected bumplessly. A system and organization for transferring between manual and automatic operation bumplessly is disclosed in detail in U.S. patent application Ser. No. 298,081, entitled "Steam Turbine System With Digital Computer Position Control Having Improved Automatic-Manual Interaction" filed Oct. 16, 1972 by Andrew S. Braytenbah, assigned to the present assignee, which application is incorporated herein by reference as though set forth at length herein. Similarly, the operation of the bypass valves is transferred to the digital computer upon closure of contact 88 over dashed line 89; and the operation of the governor valves is transferred to the digital computer 82 upon closure of contact 90 over dashed line 91. Contacts 92 and 93 respectively open to disconnect the operation of the bypass valves and the governor valves from manual control. The reactor control system 48 is indicated as being connected to the digital computer over dashed line 94.

Referring again to the control and indication panel 60, the operation of the reactor turbine system may be in several operating modes. When the turbine is not latched, as indicated by line 100 connecting indicator lamp 101 to decision block 102, "reactor start" is indicated by the indicator 101. In this operating mode, the reactor is operated manually. When the turbine is latched, and the circuit breaker(s) is open, indication lamp 103 is connected to decision block 104 over line 105. When the circuit breaker is closed, and the reactor generation rate does not equal the governor valve flow, indication lamp 106 is connected to decision block 107 over line 108 to indicate a "turbine load" mode of operation. When the reactor generation rate is equal to the governor valve flow, and the reactor is being operated manually, indication lamp 109 is connected to decision block 110 over line 111 to indicate to the operator that the operating mode is in the turbine follow operation with the reactor on manual. When the reactor is placed in automatic operation, the indicator lamp 112 is connected to the decision block 110 over line 113 to indicate that the system is in a turbine follow reactor automatic mode. The various modes of operation are described as mode 1 through mode 5 inclusive. For example "reactor start" is referred to as mode 1, "turbine start" mode is referred to as mode 2, "turbine load" is referred to as mode 3, "turbine follow reactor manual" load is referred to as mode 4, and "turbine follow reactor automatic" is referred to as mode 5 hereinafter.

Figure 3A:
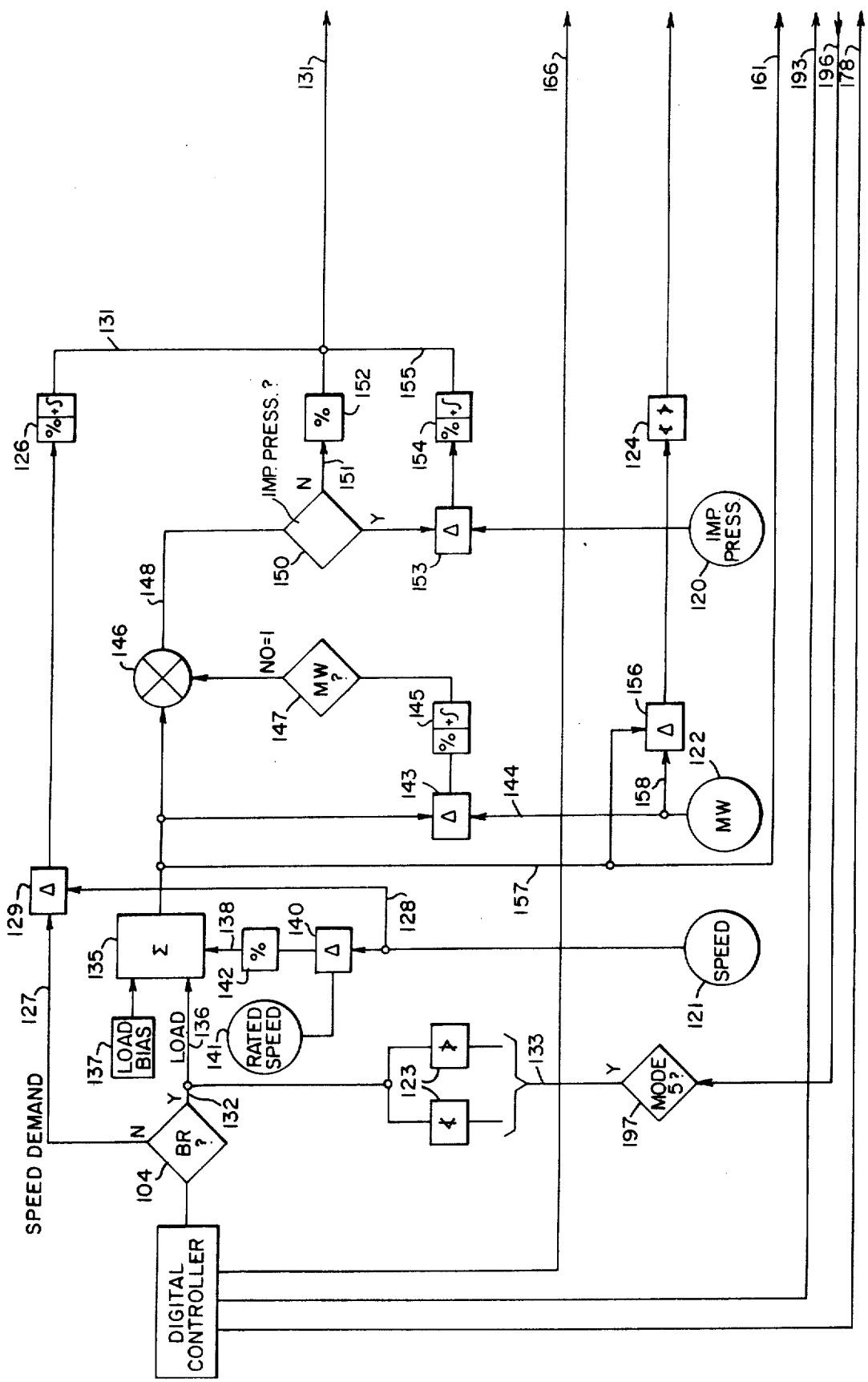
FIGS. 3A and 3B show a schematic diagram of a combination digital and analog system in accordance with the present invention.
Figure 3B:
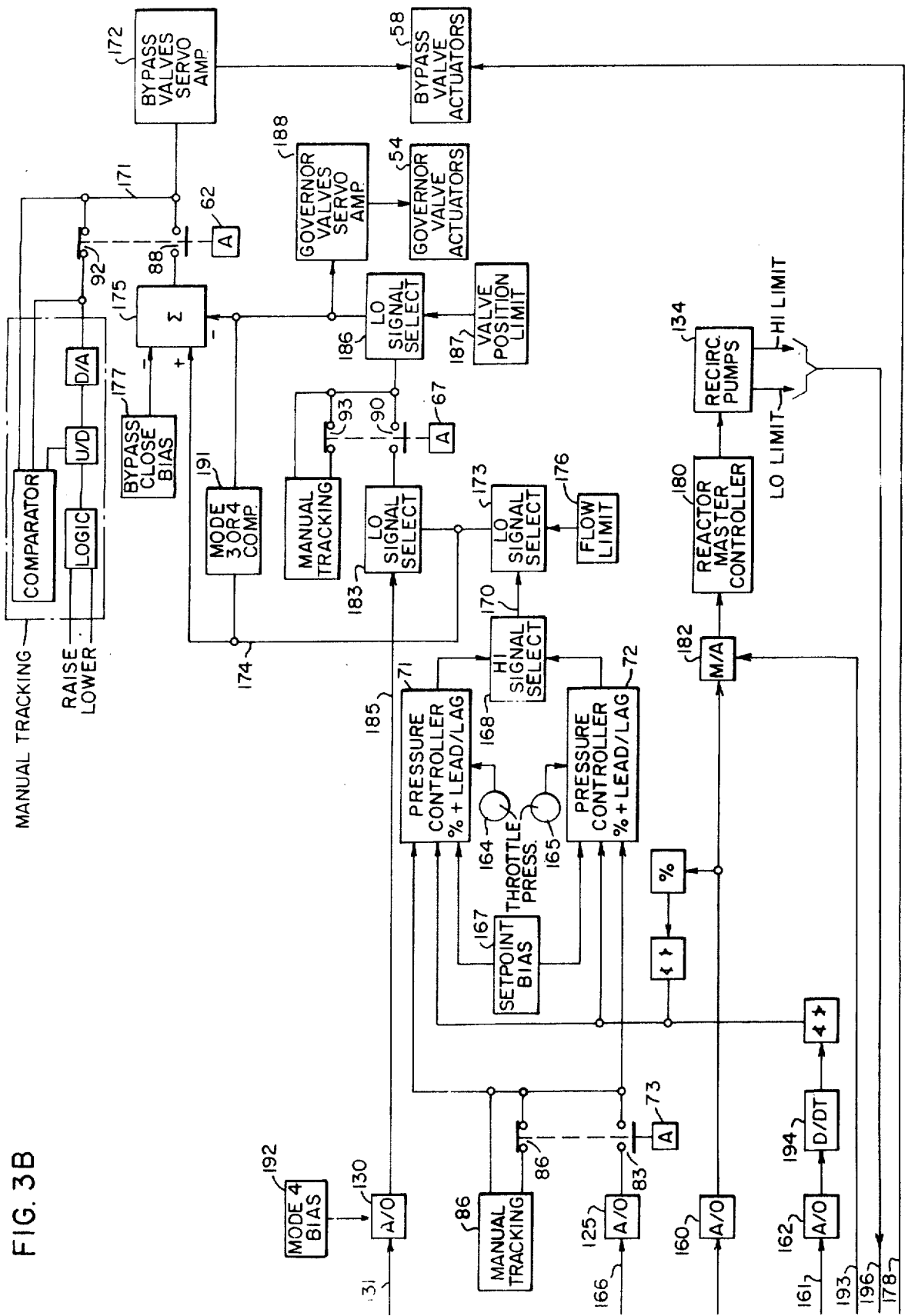

The conditions necessary for placing the system in the previously described operating modes will be described in connection with FIG. 3. FIG. 3A is the digital portion of the system, and is included in the computer organization previously referred to at 82 in FIG. 2. FIG. 3B is the analog portion of the system.

In connection with the digital portion of the system (see FIG. 6) a control task computes governor valve analog outputs to position such valves to achieve the desired speed or load demand when the system is in automatic control. When the system is in manual control, the control task tracks the analog system valve position demand signals in preparation for transfer to automatic control. This control task, in accordance with one embodiment, is assigned a high priority level and is bid by an auxiliary synchronizing task every one-half second. Automatic control requires interacting feedback control system capable of compensating for dynamic conditions in the power system, and the turbine generator. Impulse pressure from transducer 120, shaft speed from transducer 121, and megawatts from the generator from transducer 122, are the feedback normally used to correct for any non-linearities and to stabilize the interactions among these variables. The digital system also contains provisions for high and low load limits represented by box 123 and 124 which can be adjusted from a control panel.

Figure 5:
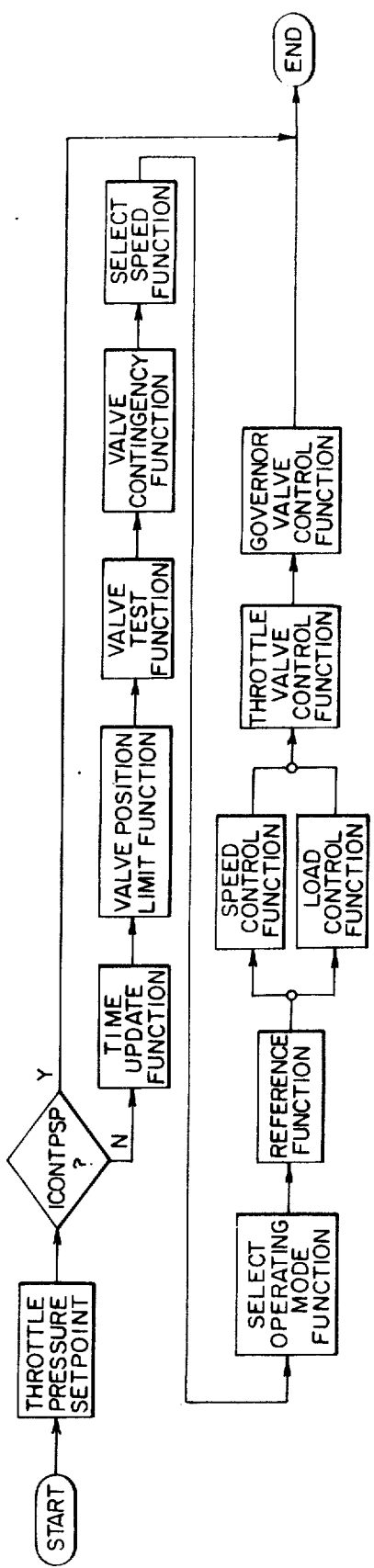
FIG. 5 is a functional flow chart of the throttle pressure setpoint function in the digital portion of the system.
Figure 6:
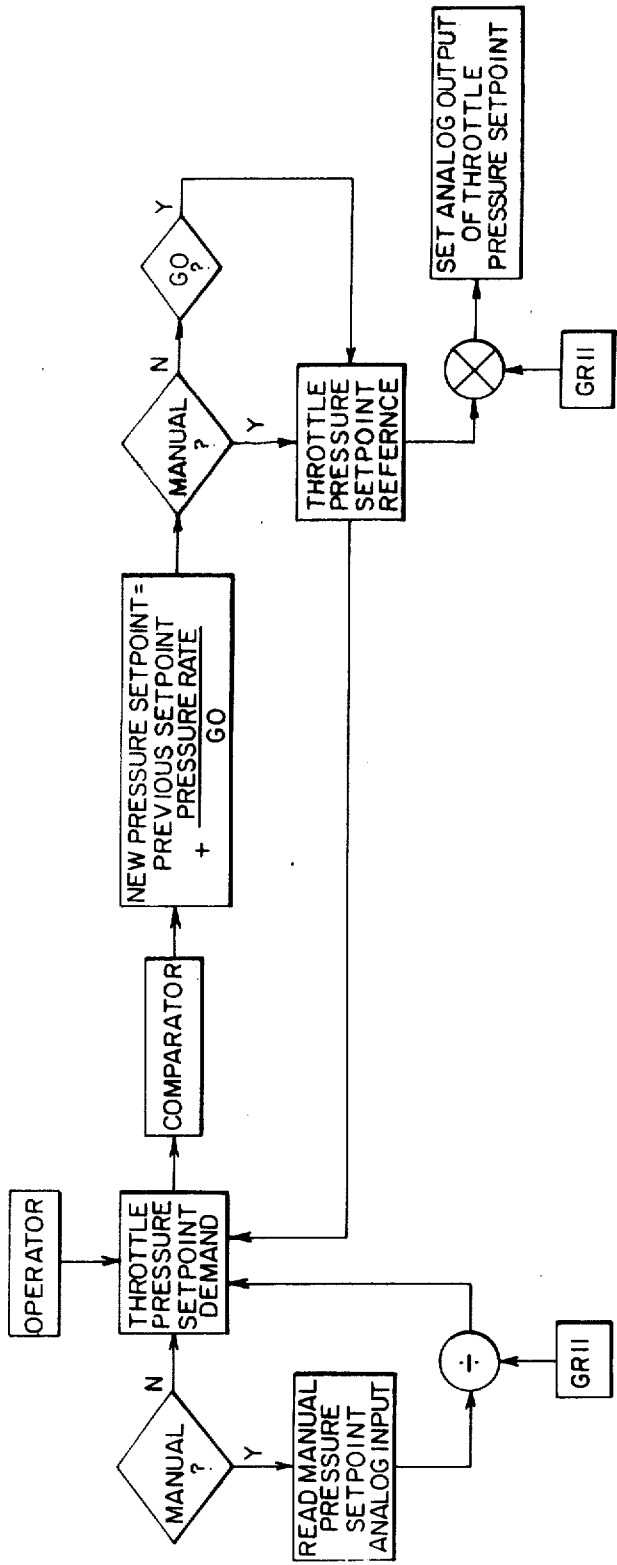
FIG. 6 is a functional flow chart illustrating the control task organization in the digital portion of the system.

The control task as shown in FIG. 6, is organized as a series of relatively short sub-programs, executed sequentially, which address themselves to particular aspects of the general control system objectives. These short subprograms or function include a throttle pressure setpoint function (see FIG. 5), a valve position limit function, a speed control function, a load control function, and a governor valve control function. The throttle pressure setpoint is computed each half second and the balance of the control task functions are computed each second. To achieve this, a flag ICONTSP is interrogated and set and reset in the auxiliary task. Referring again to FIG. 3, the throttle pressure setpoint function provides an analog output represented by block 125 to the pressure controllers 71 and 72 located in the analog portion of the system. The speed control function positions the governor valves to achieve the existing speed reference with optimum dynamic and steady state response by using a proportional plus reset controller 126. The speed error between the turbine speed reference on line 127 and actual speed from the transducer 121 over line 128 is obtained from comparator 129 to drive the controller 126 to the analog output box 130 over line 131.

When the circuit breaker denoted by the decision block 104, is closed the speed demand signal from the DEH controller becomes a load demand signal on line 132. The limiters 123 are connected by line 133 from reactor circulation pumps denoted by block 134 to prevent a load demand signal which is in excess of the high limit of the reactor recirculation system or below the low limit of the reactor's recirculation system for reasons described in more detail hereinafter.

The load demand signal is output to a summing junction 135 over line 136. This summing junction includes a load bias referred to as 137 to insure that an increase in load demand, while in mode 5, continues to provide control of the governor valves by the pressure regulator 71 and 72. Speed error is also output to the summing junction 135 over line 138. The speed error is determined by comparing in block 140 rated speed referred to at 141 and the actual speed from the transducer 121. The compared speed is then input to a proportional controller 142 to provide an output on line 138 which is a predetermined portion of the input from the comparator 140. The output of the summing device or junction 135 is compensated with two feedback trim factors to account for frequency (speed) participation and megawatt mismatch.

When the megawatt loop is in service, the output of the summing junction 135 is compared by a comparator 143, and the actual megawatts from the transducer 122 over line 144. The output of the comparator 143 is input to a proportional plus reset controller 145, the output of which is multiplied by the output of the summing junction by device 146. If the megawatt loop is out of service as denoted by decision block 147 the factor to the multiplier is one, thus making the output of the multiplier 146 equal to the input.

The load reference, which is corrected for speed error, as previously described, and megawatt error if the loop is in service, becomes the setpoint or flow demand for the governor valves on line 148. If the impulse pressure feedback loop is not in service as referenced by decision block 150, the flow demand is output on line 151 through a proportional controller 152 to the analog output 130. If the impulse pressure loop is in service, then the flow demand signal from line 148 is compared by comparator 153 with the impulse pressure from the transducer 120. The output of the comparator 153 is connected to a proportional plus reset controller 154 to drive the impulse pressurer to zero on line 155 which is input to the analog output 130. High and low limits restrict the range of variation of the controller 154 to eliminate the possibility of reset windup.

The output of the summing junction 135 is also compared by comparator 156 connected by line 157 with the megawatt transducer 122 by way of line 158 to produce a megawatt compensated load demand signal for input to an analog output 160 through the limiter 124. The output of the summing junction is also connected by way of line 157 and 161 to the input of analog output 162. The analog output 160 controls the reactor circulation system including the reactor circulation pumps 134 of the analog system to be described hereinafter. The analog output 162 adjusts the pressure setpoint to the throttle pressure controllers as described hereinafter.

The analog portion of the system, which interfaces with the previously described digital portion is interfaced through the analog output devices 130, 125, 160 and 162. The analog system includes the two analog pressure controllers 71 and 72 with separate pressure transducers 164 and 165. The pressure setpoint is adjustable either in automatic or manual from the control and indication panel as previously mentioned in connection with FIG. 2. When in automatic control, the pressure setpoint is applied to the pressure controllers 71 and 72 over line 166 coming from the digital controller, through the analog output 125 and the closed contact 83. When the pressure setpoint is adjusted manually, the contact 85 at the output of the manual tracking block 86 is closed to adjust the setpoint from the control panel of FIG. 2. A setpoint bias 167 determines which pressure controller 71 or 72 is in control. The other controller acts as a backup controller. A high signal selector 168 permits the signal from the pressure controller in control, depending upon the setpoint bias, to pass to output line 170.

The function of the analog portion of the system and its cooperation with the previously described digital portion of the system will be described in connection with the various operating modes from mode 1 through mode 5 in both the manual and automatic modes of operation. First, when the turbine is not latched, the "reactor start" mode 1 indicator on the panel of FIG. 2 is lit. When the turbine is on turning gear and the condenser vacuum is of a predetermined amount, the bypass valves can be positioned manually with the contact 92 closed by way of line 171 and bypass valve servo amplifier 172. The bypass valves can also be positioned from the output of the pressure controllers 71 or 72 through a low signal select device 173, line 174, summing device 175, the closed contact 88, and the bypass valve servo amplifier 172.

The low signal selector 173 is provided to insure that the steam flow does not exceed a flow limit as determined by limiting device 176. A bypass valve close bias referred to at block 177 is provided as an input to the summing device 175 to insure that the bypass valves are closed when no signal is present on line 174. A contact closure output is provided on line 178 from the digital controller to energize a solenoid valve (not shown) on the bypass valve actuator 58 to energize the solenoid valve when the load is less than 25%. The solenoid valve normally isolates the actuator from the emergency trip header when energized, and permits the actuator to be operated to open the bypass valve even though the turbine may be tripped. When the solenoid valve is energized, the bypass valve trips open in the event of contingencies.

In mode 1, the reactor may be started manually by operation of the control rods and the recirculation system via the reactor master controller 180 and the manual automatic controller 182 in its manual position. When the pressure setpoint is at 150 psi and the actual reactor pressure is less than this value, or when the manual and automatic signals for the bypass are equal, the automatic bypass valve control can be selected on the control panel. Should the reactor pressure be above 150 psi prior to automatic operation of the bypass valves it is necessary to adjust the pressure to obtain a setpoint to a value near the actual pressure so that a null position is existent on the bypass valve tracking meter. Should the digital controller stop, the pressure setpoint control automatically rejects to manual at the existing setpoint by the opening of contact 88 and the closing of contact 92. Failure of both pressure transducers 71 and 72 automatically causes the contact 88 to open and the contact 92 to close in a manner hereinafter described in connection with the detailed operation of the pressure failure control system portion of the analog control. In mode 1, the reactor pressure can be increased from 0 to 1000 psig with pressure control on the bypass valves above.

When the turbine is latched and the breaker is open, (see FIG. 2), the "turbine start" or mode 2 on the control panel is lit. Prior to entering this mode, the reactor pressure and steam generation state must be of a sufficient level to permit roll off of the turning gear of the turbine. When the turbine is latched, the turbine stop valves, interceptor valves, and reheat stop valves, (not shown) open, and the governor valves stay in the closed position. The operator selects a reference for speed and an acceleration rate utilizing the appropriate pushbuttons on the digital control panel (not shown). The turbine governor valves are controlled by the output of the pressure controllers 71 or 72, or the analog output of the digital system, as determined by the low select circuit 183. Thus, as long as the output of the pressure controller 71 or 72 is higher than the speed demand, the starting up of the turbine is controlled by the digital system over the line 127, the comparator 129, the proportional plus reset controller 126, line 131, analog output 130, and line 185 to the low signal select circuit 183. Normally, for wide range speed control, the speed generation of the reactor is sufficiently high so that the output of the pressure controllers 71 or 72 is higher than the speed control signal from the analog output 130 of the digital system. This permits speed control of the turbine while pressure control is maintained on the bypass valves by way of the pressure controller as previously described.

In mode 2 the reactor remains under manual control of the operator by way of the manual/automatic station 182. The output of the low signal selector 183 goes through closed contact 90 of the automatic control for the governor valves, a low signal select 186 which insures that such signal will not exceed the valve position limit referred to at 187 to the governor valve servo lamp 188. The output of the low signal select 186 is also connected to the input of the summing device 175 to the bypass valve servo amplifier 172 over line 190. The input from line 190 to the summing device 175 is of opposite polarity to the bypass control from line 174 which tends to cancel out the effect of the bypass valve signal when in the mode 1 position such that the bypass valve closes as the governor valve servo amp opens the governor valves. If the speed demand signal from line 185 is too high for the generation rate and pressure of the reactor, which is an abnormal situation, the governor valves would open as the steam generation rate is increased regardless of the speed demand signal. If the digital controller should fail while in mode 2, the contact 90, and the contact 88 opens to transfer the operation of the valves to manual, and leave such valves in the same position prior to the digital computer failure.

When the main generator breaker is first closed, which is referenced by the decision block 104, the "turbine load" or mode 3 indicator on the control panel is lit. A permissive is included in the circuit breaker logic to prevent the closure of the breaker until the steam generation level of the reactor is above a predetermined amount, such as 15%, for example. This permissive (not shown) insures that control of the pressure remains on the bypass valve over line 174 when the initial load is added at breaker closure. On breaker closure, the digital system reference becomes a load reference on line 132 from decision block 104. When operating in mode 3, the impulse chamber pressure and/or the megawatt feedback loop, previously described, may be placed in operation. As the operator increases the load demand signal, a point is reached in which the steam generation level of the reactor satisfies the governor valve flow. As the governor valves are opened by the increase in load reference over line 185, the bypass valves are closed by a summation of the output of the pressure controller over line 174, governor valve position signal over line 190, and the closing bias 177.

When the governor valve position signal on line 190 is equal to the pressure controller signal on 174, a comparator 191 detects this condition and initiates a transfer to mode 4, or "turbine follow reactor manual". The valve position limit control 187 is provided to limit the total travel of the governor valves in mode 3. If the governor valve position signal at the output of the low signal selector 186 is limited by the valve position limit, the bypass valves are opened correspondingly due to the summation of the pressure controller signal on line 174 and the limit of the valve position signal on line 190.

If the digital system becomes inoperative in mode 3, governor valve control is transferred to manual control by the automatic closing of the contact 93 and the opening of the contact 90. The pressure controllers 71 and 72 maintain pressure in the reactor by positioning the bypass valves over line 174 as long as the bypass valves remain in the automatic mode.

When the operating point at which the bypass valves are just closed is reached, as determined by the comparator 191, the mode 4 indicator on the control panel is lit. The comparator. 191 also initiates logic which applies a bias referred to as 137 at the input of the summation junction 135, in the digital system, which insures that the pressure controller signal instead of the compensated load demand signal on line 185 passes through the low signal selector 183 to control the governor valves in this mode.

The bypass valves continue to remain closed, unless the governor valve position signal on line 190 does not follow the pressure controller signal on line 174. Since these two signals are summed as an input to the summing device 175, the bypass valves remain closed as long as the pressure controller signal on line 174 is greater than the sum of the governor valve position signal on line 190 and the bypass valve closing bias 177. In mode 4, the reactor is still in manual control; and plant load can be increased at this time by manually increasing the reactor generation level either with the recirculation control or rod control. An increase in steam generation rate in mode 4 causes the pressure to rise and open the governor control valves through the proportional range of the pressure controllers 71 or 72. As the reactor power level is increased in mode 4, the load demand from the digital system on line 185 should be increased in order to keep the analog output from the low signal selector 183 responsive to the pressure controller output, thus causing the pressure controller output to position the governor valves. If the load demand signal on line 185 is not increased in mode 4 as the power level is increased, the bypass valves open to control pressure, as the governor valves are limited by the load demand signal on 185 which passes through the low signal selector 183. When the bypass valves do open to control pressure the comparator 191 transfers the operation to mode 3, thus removing the bias 137 from the summing junction 135, and lighting the indicator light on the control panel for mode 3.

When the transfer is initiated from mode 3 to mode 4 by action of the comparator 191, the feedback control loops of megawatts and impulse pressure are removed from the digital portion of the system. If the digital system becomes inoperative when operating in mode 4, the governor valves remain in automatic control from the output of the pressure controller 71 or 72 through the low signal selector 183, the closed contact 90 and the low signal selector 186. However, control of the pressure setpoint on line 166 is transferred to manual operation. If both pressure transducers 71 and 72 fail while operating in mode 4, both governor and bypass valve control are automatically transferred to manual by the opening and closing of the contacts 90 and 93, and 88 and 92 respectively. Also, when the digital system becomes inoperable in mode 4, a bias such as referred to at block 192, is applied to the analog output 130 to maintain the pressure controller signal at the output of the low signal select circuit in control of the governor valves.

The flow limit is adjustable on the control panel (see FIG. 2) from 90 to 130%, for example, reactor flow. The low signal selector 173 determines the lower of such flow limit adjustment, and the pressure controller signal on line 170 from the high signal selector 168 determines the limiting opening and the governor or bypass valves.

When the system is operating in mode 4 and the governor and bypass valves are in automatic control, and a permissive signal is transmitted from the digital system over the line 193, for example, to the manual automatic reactor controller 182, the turbine follow reactor automatic indicator on the panel of FIG. 2 is lit. When in mode 4, it is possible to adjust the load demand in order to zero the load demand error signal on the line 157 to facilitate the transfer to mode 5. In transferring to mode 5, the reactor control system must be in balance between the load demand error furnished on line 157 from the digital system and the manual automatic station 182.

When in mode 5, the governor valves through the governor valve servo amplifier 188 and the governor valve actuator 54 are under the control of the pressure controller 71 or 72. The load demand is used to generate a load demand error signal on the line 157 by comparison with actual megawatts at the comparator 156 of the digital system as an analog output to block 160 to the manual automatic controller 182 for operating the reactor master controller 180 in the automatic mode. As the operator increases the load demand while in mode 5, the load demand error signal acts to increase the reactor circulation control by way of the reactor master controller 180 which controls the reactor recirculation pumps referred to at block 134. This increase in the power level of the reactor causes the pressure controller 71 or 72 to open the governor control valves and pick up the turbine generator load until a balance is again established between actual megawatts and the load demand.

Also, in mode 5, operational changes in the load demand signal effect the analog output block 162 to adjust the setpoint of the pressure controllers 71 and 72 by a derivative circuit 194. This repositions the governor valves in anticipation of an increase load and steam flow.

If the reactor manual automatic station 182 reverts to manual while in mode 5, the digital system reverts to mode 4, with the governor valves being controlled by the pressure controllers 71 or 72. If the digital system becomes inoperable while in mode 5, the system reverts to mode 4 with the governor valves being operated by the pressure controllers 71 or 72. Also, the governor valves or the bypass valves transfer to manual control if the reactor permissive is removed while in mode 5. This action transfers the system to mode 4, with manual control of the governor and/or bypass valves. The bypass close bias 177 insures that while operating in mode 5, transient changes in mode which might cause the bypass valves to open do not transfer the system out of mode 5. If the overall digital system is removed from reactor automatic control (mode 5) the system transfers to mode 4.

As previously mentioned the load output of a boiling water reactor is a function of control rod position and the recirculation flow. The recirculation flow has a range in excess of approximately 25%. When both the turbine and the reactor are in automatic control or mode 5, a load demand for the turbine control is compared with the megawatt output of the generator by the comparator 156 to provide an output through the limiter 124 to the analog output block 160 for controlling the reactor. In addition, as mentioned previously, the load error is used to automatically adjust the pressure setpoint of the pressure controllers 71 or 72 through the analog output block 162. When the recirculation system is at its limit a change of load demand will not result in the desired change of load level because of the limited range of the recirculation system. Thus, in order to prevent an excessive deviation of throttle pressure and possibly unstable reactor operation, a high and low limit from the reactor circulation system such as from the reactor circulation pumps referred to at block 34 is connected by line 196 through the mode 5 decision block referred to at 197, the line 133 and the limiter 123 to the load demand line 132. This prevents the load demand from exceeding either the high or low limit of the recirculation system when the system is in mode 5 operation by setting the load demand at the high load limit when such load demand would exceed the recirculation limit and setting the load demand at the low load limit when such demand would be outside the low recirculation limit. Thus, the load error which is connected to the reactor control system through the analog output block 160 is not permitted to indicate a load demand error greater than the actual load. When a higher or lower load level or for automatic recirculation control range is required, the control rods must be positioned manually.

Figure 4:
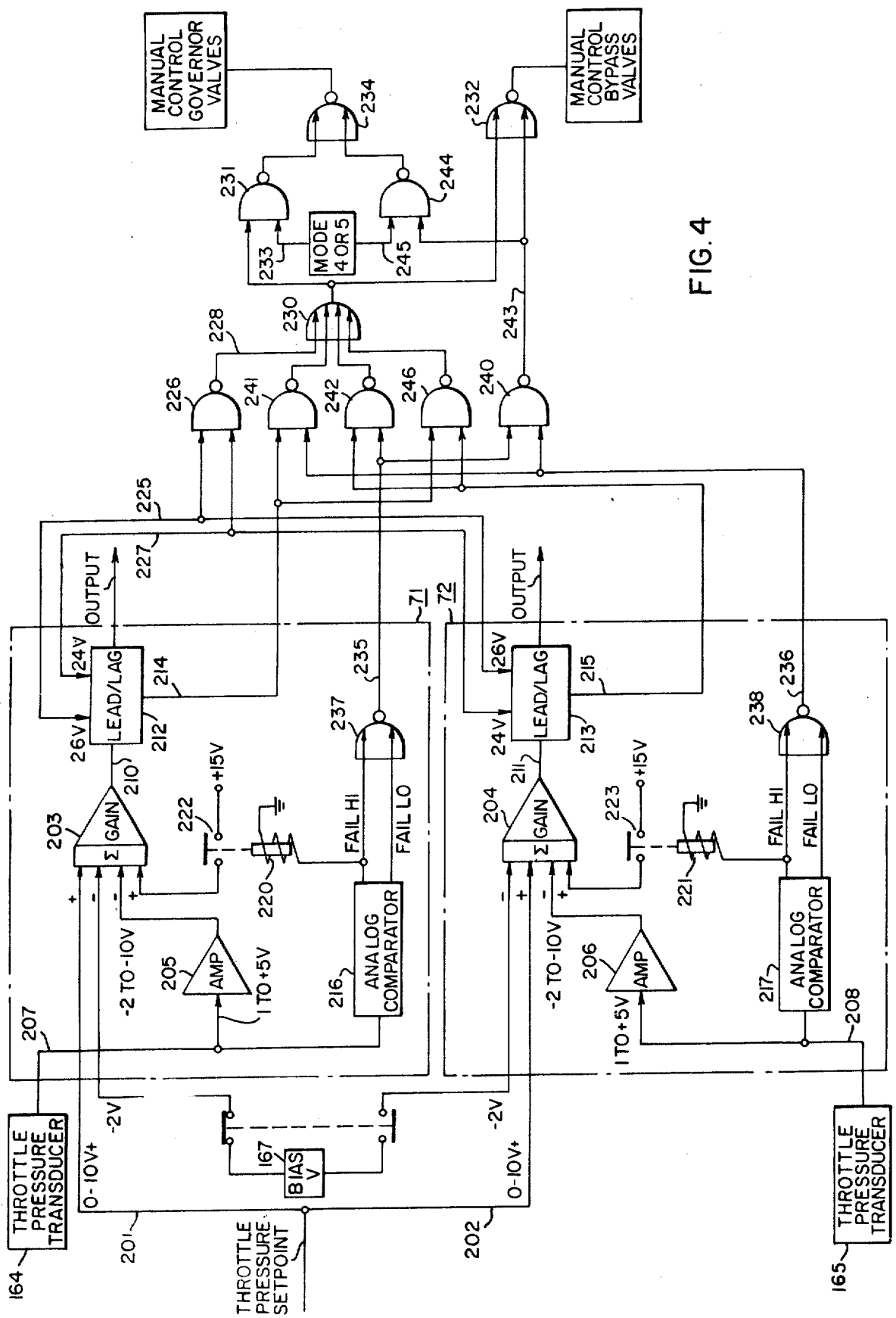
FIG. 4 is a schematic diagram of the circuitry of the throttle pressure controllers and the system for transferring control of the governor valves and bypass valves to manual in the event of certain contingencies.

Referring to FIG. 4, the pressure controllers 71 and 72 each include identical analog circuitry. The throttle pressure transducer 164 is used with the pressure controller 71 and the throttle pressure transducer 165 is used with the controller 72. The throttle pressure setpoint signal is input in parallel over line 201 and 202 to a summing device 203 and 204 for the controllers 71 and 72 respectively. The setpoint signal in one embodiment of the invention varies between 0 and 10 volts positive, which corresponds to a pressure setpoint of 0 to 1200 psi. The summing device 203 and 204 each has a gain G connected therewith. The bias signal 167 may be connected in a conventional manner to either the summing device 203 or 204 to apply a predetermined positive bias to the input of either 203 or 204. This positive bias increases the output of one controller over the other to the input of the high signal selector 168 (see FIG. 3) as previously described. Each of the throttle pressure transducers 164 and 165 have an output of from one to five volts positive to correspond to an actual pressure of 0 to 1200 psi. The output of the throttle pressure transducers are input to amplifiers 205 and 206 over lines 207 and 208 respectively. The output of the amplifiers 206 is inverted so that the input ranges from −2 to −10 volts for input to each of the amplifiers 203 and 204. The throttle pressure transducers 164 and 165 are each biased to have a so called droop, that is, to insure that there is always a signal present at the output of the summing devices 203 and 204 in a steady state condition. When the signal on the output of the summing devices 203 and 204 is negative, the valves move toward an open position; and when the signal is positive the valves move toward a closed position. Assuming a gain of 10 for each of the summing devices 203 and 204, a throttle pressure setpoint of 5 volts for example results in a positive 50 volt output on lines 210 and 211. However, the throttle pressure transducers 164 and 165 are each supplying a negative voltage of 2 volts to the input of the summing devices thus giving a net voltage output of a positive 30 volts which tend to keep the valves closed. As the throttle pressure increases the negative voltage increases on lines 210 and 211 and the valves will remain in the same position until the actual throttle pressure equals the throttle pressure setpoint which would correspond to an input of −6 volts with a resulting negative 10 volts on the outputs 210 and 211; and open the valves to a point corresponding to a 10% negative signal. If the generation rate of the reactor should be such that the pressure continues to increase, the negative signal on lines 210 and 211 would correspondingly increase, thus opening the valves further. If the generation rate of the reactor were such taht the throttle pressure actually decreased from the throttle pressure setpoint, the signal would become positive tending to close the valve. The output of each of the summing devices 203 and 204 is connected to a lead lag circuit card 212 and 213 respectively. The characteristics of the lead lag card, which form no part of the present invention include the provision of two individual power sources for each of the cards 212 and 213. One of the power sources for each of the lead lag cards is 24 volts and the other power source is 26 volts. Only one of the sources is required, as the lead lag card is provided with conventional power auctioning. Also, each of the cards provides a logical signal on line 214 and 215 indicating that it has an "on card" power failure. For a more detailed understanding of a lead/lag circuit of the type mentioned, reference is made to U.S. patent application Ser. No. 269,000, filed by James T. Carleton on July 7, 1972, entitled "Compensation Apparatus and Method" and assigned to the present assignee.

Connected to the output of the throttle pressure transducer 164 is conventional analog comparator 216, and connected to the output of the transducer 165 is an analog comparator 217. Each of these analog comparators provides a logic signal in the event that the pressure transducer should exceed a certain value; and another logic signal in the event that the pressure transducer should be below a certain value. Thus, the analog comparators 216 and 217 provide a fail high and a fail low output for each respective transducer.

As mentioned previously, a bias signal is applied to one or the other controllers so that one controller is in control, and the other in standby as dictated by the input to the high signal selector 168 (see FIG. 3). The failure of a throttle pressure transducer in a direction that causes the output of the associated controller to be lower than normal transfers control to the other transducer, because it then has a higher output signal relative to the failed controller for input to the high signal selector 168 provided that such failure is sufficient to make such signal lower than the other. If the throttle pressure transducer should fail in a direction that causes the output level of its controller, to be higher than normal the valves, would tend to "close" and such controller with its associated failed transducer could continue in control. However, with the benefit of the present invention, relays 220 and 221 are normally energized by the analog comparators 216 and 217, respectively, when the associated throttle pressure transducers 164 and 165 are operating properly. Upon failure of one transducer either in a high or a low direction, the associated relay 220 or 221 is deenergized, thus closing the respective contact 222 or 223, to apply a positive voltage of 15 volts, for example, to the input of the associated summing device 203 or 204. The application of this positive voltage, insures that the output of the non-failed controller is higher than the failed controller, if the failure is in a direction that tends to raise the controller output level, regardless of the direction of transducer failure.

Each of the pressure controllers 71 and 72 includes a number of other components which are subject to failure in addition to the associated throttle pressure transducers 164 and 165; namely, the summing devices 203 and 204, the lead lag circuits 212 and 213, and the power supplies on lines 225 and 227 for the lead lag circuits 212 and 213. Should the 26 volt power supply fail, wire 225 is deenergized which removes energy from a NAND gate 226, which of course results in nothing more than the other pressure controller taking over control. However, if the 24 volt power supply should also fail, wire 227 is deenergized which causes the gate 226 to conduct, which provides a signal on line 228 through OR gate 230 to the input of NAND gates 231 and OR gate 232 to transfer control of the bypass valves to manual. A failure of any of the components, except the pressure transducers in one of the controllers, is assumed to lower or remove the output signal, so that the high signal selector passes the output of the non-failed controller. If the system is in mode 4 or mode 5, wire 233 is deenergized and an output is provided through the NAND gate 231 to OR gate 234 for shifting control of the governor valves to manual. The shifting of the valve controls to manual operation may be in accordance with the previously referred to U.S. application Ser. No. 298,081 incorporated herein by reference.

In the event that both throttle pressure transducers should fail either in the high or low direction, an output signal appears on lines 235 or 236 from OR gates 237 and 238. The failure of transducer 265 merely deenergizes an input to NAND gate 240 and 241 which has no effect on the system. Similarly, if only transducer 164 fails the input on line 235 is removed from NAND gate 242 and 240, which has no effect on the system. However, if both transducers fail, NAND gate 240 provides a signal on line 243 through the OR gate 232 for manual control of the bypass valves, and to NAND gate 244 for transferring to manual control of the governor valves when input 245 is deenergized denoting that the system is in either mode 4 or mode 5. If the lead lag circuit 212 should fail, the line 214 is deenergized which leads to NAND gates 241 and 246. If the lead lag circuit 213 fails, energy is removed from the line 215 to NAND gates 246 and 241. Thus, if both lead lag circuits fail, NAND gate 246 conducts to transfer control of the bypass and governor valves as previously described to manual. If the transducer 165 fails and the lead lag circuit 212 fails the NAND gate 241 conducts to place the valves on manual control. Thus, from the foregoing it is seen that any combination of failures which would effect both transducers will transfer to manual control, the governor valves depending upon the mode of operation, and the bypass valves, regardless of the mode of operation. At the same time, a failure which would tend to produce a high output is converted to a failure that would tend to produce a low controller output, to provide for safe operation and transfer to the other controller when only one of the transducers or components has failed.

The foregoing description has been presented only to illustrate the principles of the invention. Accordingly, it is desired that the invention be not limited to the particular digital and analog embodiment described but rather it be accorded an interpretation consistent with the spirit and scope of its broad principles.

What is claimed is:

1. A system for operating an electric power plant, comprising a boiling water reactor and steam turbine, a plurality of inlet and bypass valves for controlling steam flow from the reactor to the turbine, an electric generator driven by said turbine, a first and second steam throttle pressure detector, means for generating a throttle pressure setpoint signal, a first and a second analog pressure controller governed by the throttle pressure setpoint signal and an associated respective first and second detector to generate an output signal for controlling the valves, first circuit means including a gating means to render the operation of the valves responsive to the output of only the controller having a first distinctive condition relative to the output of the other controller, selection means to selectively cause the first and second controller output to be in said first distinctive relative condition, second circuit means responsive to a failure of the first pressure detector to cause the output of the second pressure controller to be in said distinctive relative condition, and third circuit means responsive to a failure of the second detector when the first detector is defective to render the first and second controllers ineffective to control the valves.

2. A system according to claim 1 wherein each of the throttle pressure detectors are capable of becoming defective in a high pressure direction and in a low pressure direction, wherein the first distinctive relative condition is an output signal of one controller that is of greater value than the output signal of the other controller, and wherein the second circuit means is operative to lower the signal of the first controller below the signal of the second controller regardless of the direction of failure of its associated detector.

3. A system according to claim 1, further comprising fourth circuit means responsive to a defective first controller to cause the output of the second controller to be in said distinctive condition.

4. A system according to claim 3, wherein said distinctive relative condition is a predetermined relative level between the output signals, said gating means being operative to conduct only one of the two relative levels, and wherein said second circuit means is operative to change the relative level of the output of the first controller to be in the first distinctive condition.

5. A system according to claim 1, wherein the third circuit means transfers control of the valves to manual control in response to a failure of both the first and second detectors.

6. A system for operating an electric power plant, comprising a boiling water reactor and steam turbine, a plurality of inlet and bypass valves for controlling steam flow from the reactor to the turbine, an electric generator driven by said turbine, steam throttle pressure detection means, said throttle pressure detection means being capable of a defect in a high pressure direction and in a low pressure direction, means for generating a throttle pressure setpoint signal, at least a first and a second pressure control means governed by the throttle pressure setpoint signal and the pressure detection means to generate an output signal to position the valves in accordance with the throttle pressure setpoint signal, selection means including a biasing means to selectively change the output of one of the control means relative to the output of the other of the control means, gating means governed by the relative outputs of the control means to conduct the output of one of the control means to operate the valves to a position requirement of the one control means, means responsive to a failure of the pressure detection means in either the high or low directions for the one control means to change the relative outputs of the first and second control means to govern the gating means to interrupt conducting of the output signal of the one control means and, means to operate the valves in accordance with the position requirement of the control means 7. A system according to claim 6, wherein at least one of the control means is an analog controller, and the means for generating the throttle pressure setpoint signal is structured in a programmed digital computer, and further comprises circuit means responsive to a failure of the pressure detection means for both the first and second control means to transfer control of the valves to manual operation.

8. A system according to claim 7 wherein said circuit means is operative to transfer control of the bypass valves only to manual operation in response to a failure in the pressure detection means for both pressure control means at times when the rate of reactor generation is greater than the steam flow to the turbine.

9. A system according to claim 7, wherein both of the control means are analog pressure controllers further comprising means to detect failures in selected components of both controllers, means to transfer control of the governor valves to manual operation in response to a detected failure in both pressure controllers at times when the steam flow to the turbine is substantially equal to the reactor generation rate, and at times when both bypass and governor valves are controlled by the pressure controllers.

* * * * *